United States Patent Office 3,582,321
Patented June 1, 1971

3,582,321
ELECTROPHOTOGRAPHIC BINDER PLATES
MADE FROM MIXTURES OF WATER
SOLUBLE RESINS
Yasuo Ueda, 3–32 Kitano-cho, Ikuta-ku, Kobe, Hyogo
Prefecture, Japan; Akira Takatsu, 3–5–16 Kusatsu-cho,
Kusatsu, Siga Prefecture, Japan; and Tatsuo Aizawa,
6–34 Kuwazu-cho, Higashisumiyoshi-ku, Osaka, Japan
Filed Nov. 13, 1967, Ser. No. 682,078
Claims priority, application Japan, Nov. 25, 1966,
41/77,664
Int. Cl. G03g 13/22, 5/08
U.S. Cl. 96—1.8    4 Claims

ABSTRACT OF THE DISCLOSURE

An electrophotographic plate for use in chargeless electrostatic printing and the method of making the same in which a base material is coated with a mixture of water soluble resins such as polyvinyl acetate emulsion and polyvinyl acetal with a photoconductor such as microcrystalline zinc oxide ground together in a ball mill with the addition of some organic acid and the coating applied to a suitable thickness so that the completed electrophotographic plate will have a memory effect and will hold a latent image of light for a limited period of time which is sufficient to provide for development to produce a contrasting image of satisfactory density and the coating can be done in the light and the electrophotographic plates can be made ready for use by being placed in the dark for a short period of time without requiring complicated procedures.

Figure 1:
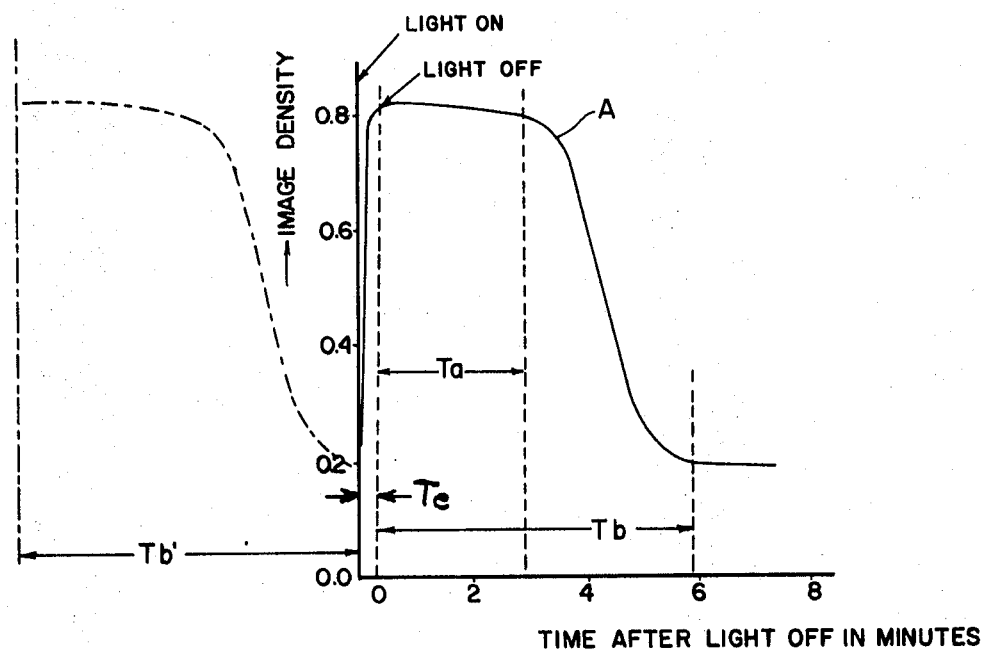

The present invention relates to chargeless electrostatic printing and to the electrophotographic plate and the method of making the same, with the electrophotographic plate having the characteristics of retaining a latent image resulting from exposure to light for sufficient time to complete the developing process and produce an image of good contrast between the image and non-image areas, which visible image will have the same density as that obtained by development immediately after exposure.

Up to the present it has been the understanding of persons skilled in the art that a water soluble resin is not suitable for producing a dense image with a high contrast and therefore alkyd resin has been used as a binder with a photoconductive material and the resulting mixture coated on a base plate and dried. However, even when alkyd resin is used as a binder, an image of satisfactory contrast is not obtained and after exposure of the alkyd resin coated electrophotographic plate to light it has required 24 hours or more for the electrophotographic plate to recover the memory effect and therefore prior art electrophotographic plates after exposure to light have had to be kept in the dark for an excessively long period of time before the electrophotographic plate could be used for reproduction. To overcome this delay in recovery of the memory effect of the alkyd resin coated electrophotographic plate, the electrophotographic plate photoconductive coating has been heated just before use or the photoconductive coating layer has been kept out of the light by being packaged in a suitable light-tight pack. However, both the heating method and the packaging method to prevent light exposure complicates the reproduction process and it makes for great difficulty in satisfactorily using the prior art materials to obtain satisfactory electrostatic prints.

Accordingly, it is an object of the present invention to overcome the difficulties of the prior art and to provide a method of making an electrophotographic plate which overcomes the difficulties enumerated above and to provide an electrophotographic plate which will be satisfactory for use in office work.

A further object is to provide an electrophotographic plate which will have a capability of holding its memory of a latent image for a sufficient time for complete development of a visible picture.

Another object is to provide a method of making copies of the desired good contrast characteristics in which the image areas will be distinct from the non-image areas.

A further object is to provide a coating mixture of two or more water soluble resins for use in making copies by the electrophotographic process.

A still further object is to provide a method of controlling the time required for the recovery of the memory effect of electrophotographic plates by changing the ratio of two or more water soluble resins.

A still further object is to provide an electrophotographic plate with photoconductive material mixed with water soluble resin binders and organic acid.

Another object of the invention is to provide an electrophotographic plate which recovers quickly by the memory effect after exposure to light so that the electrophotographic plate is not damaged by exposure to light and the electrophotographic plate can be used in the usual manner after the electrophotographic plate is placed in darkness a sufficient time for the memory effect to restore the initial conditions and so that an image of proper contrast can be obtained.

Briefly, the present invention provides for a method of making an electrophotographic plate on a base material of art paper or the like by applying a coating mixture of a photoconductive material with water soluble resins and organic acid and drying the coating on the base in a uniform layer. The resulting electrophotographic plate having the characteristic of recovery of the memory effect or recovery from exposure to light so that even when the electrophotographic plate has been exposed to light such exposed electrophotographic plate can be restored to its original condition by being placed in the dark for a time sufficient to regain the initial state. Also, the memory effect is such that the exposure of the electrophotographic plate to a light image will be retained by the memory effect for a sufficient time to permit satisfactory development of a picture with a suitable toner developer before the intensity of the latent image is appreciably reduced.

It has been proved by experiment that a mixture comprising 2 or more water soluble resins such as polyvinyl acetate emulsion, and polyvinyl acetal may be added to a photoconductive material and the resulting mixture coated and dried to produce an electrophotographic plate on a base that such an electrophotographic plate holds substantially the same surface potential for about 3 minutes as the surface potential that was obtained just after exposure. Therefore the latent image maintains the same intensity for approximately 3 minutes and the developing process may be carried out over this period of time and a suitable print of satisfactory density and satisfactory contrast between image and non-image areas is obtained.

It has also been proved by experiment that it is possible to control the time of recovery of the memory effect according to the properties of the photoconductive material by changing the ratio of mixing the various water soluble resins used.

It is also possible to shorten and control the time for recovery of the memory effect more effectively by adding the water soluble resin binder to a mixture comprising a photoconductive material and a small amount of an organic acid such as citric acid or oxalic acid.

Referring more specifically to the drawing wherein:

FIG. 1 is a graph of the decay curves showing the times required for the recovery of the memory effect in relation to the density of the developed image and the passage of time after the exposure light is turned off. Solid line curve A shows the ideal state of the recovery of the memory effect and illustrates the intensity of the latent image upon the passage of time.

The time interval $T_e$ indicates the time required for exposure to light to obtain a satisfactory latent image and the time indicated as 0 minutes is the time the exposure light is turned off. The time interval $T_a$ of approximately 3 minutes shows the time within which the latent image should be developed after the exposure light is turned off.

Time $T_b$ shows the time required for recovery of the memory effect and the complete dissipation of the latent image from the light exposure. The time $T_b'$ shows the time required after exposure of the electrophotographic plate to daylight for recovery of the memory effect and this time is substantially the same as time $T_b$.

Figure 2:
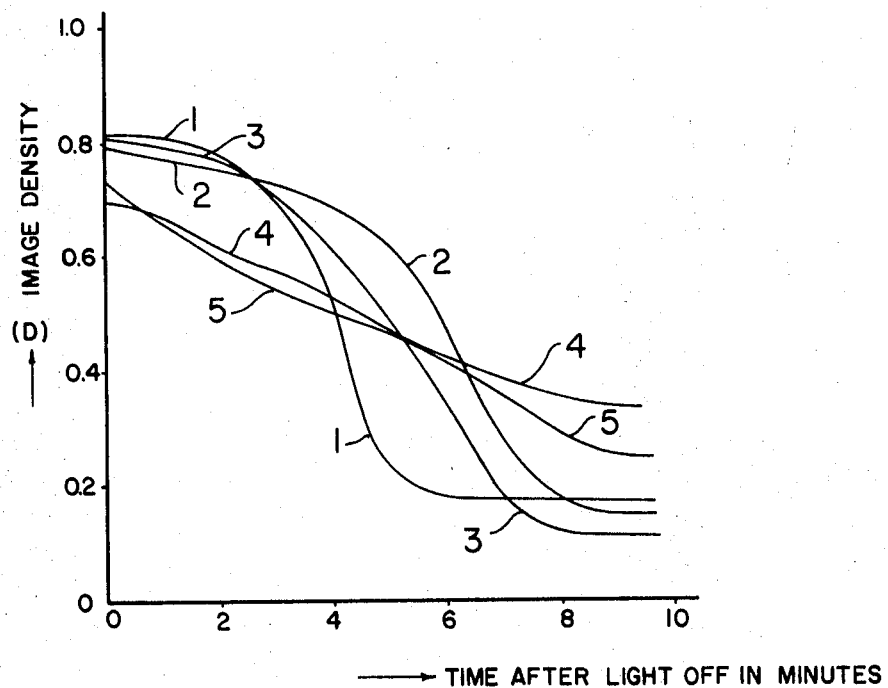

FIG. 2 illustrates the decay curves showing the time required for recovery of the memory effect with relation to the density of the developed image on each of five different electrophotographic plates in which the photoconductive coating layers are formed of different ratios of the 2 water soluble resins in the mixture.

+ TABLE I

| Curve | 1 | 2 | 3 | 4 | 5 |
|---|---|---|---|---|---|
| Polyvinyl acetate emulsion, g | 4 | 3 | 2.5 | 1.5 | .5 |
| Polyvinyl acetal, g | .5 | 1.5 | 2 | 3 | 4 |
| Microcrystalline zinc oxide, g | 10 | 10 | 10 | 10 | 10 |
| Good density when developed | (1) | (2) | (2) | (2) | (2) |
| Fast decay after (minutes) | 3 | 5 | 3 | 1 | 0 |
| Recovery of the memory effect after (minutes) | 8 | 8 | 8 | 9 | 9 |

[1] Within 3 minutes after exposure.
[2] Just after exposure.

The above table indicates the proportions of the water soluble resins and the microcrystalline zinc oxide and the results therefrom.

It will be apparent that the curves numbered 1–5 inclusive in FIG. 2 correspond to particular electrophotographic plates so that the curve number on the above table indicates the memory effect characteristics of the correspondingly numbered sample.

Curve 1 shows the state of the recovery of the memory effect caused by exposing to light on the electrophotographic plate 1 of which photoconductive coating layer consists of a mixture comprising 4 g. of polyvinyl acetate emulsion and 0.5 g. of polyvinyl acetal per 10 g. of microcrystalline zinc oxide.

Curve 2 shows the state of the recovery of the memory effect caused by exposing to light on the electrophotographic plate 2 of which photoconductive coating layer consists of a mixture comprising 3 g. of polyvinyl acetate emulsion and 1.5 g. of polyvinyl acetal per 10 g. of microcrystalline zinc oxide.

Curve 3 shows the state of the recovery of the memory effect caused by exposing to light on the electrophotographic plate 3 of which photoconductive coating layer consists of a mixture comprising 2.5 g. of polyvinyl acetate emulsion and 2 g. of polyvinyl acetal per 10 g. of microcrystalline zinc oxide.

Curve 4 shows the state of the recovery of the memory effect caused by exposing to light on the electrophotographic plate 4 of which photoconductive coating layer consists of a mixture comprising 1.5 g. of polyvinyl acetate emulsion and 3 g. of polyvinyl acetal per 10 g. of microcrystalline zinc oxide.

Curve 5 shows the state of the recovery of the memory effect caused by exposing to light on the electrophotographic plate 5 of which photoconductive coating layer consists of a mixture comprising 0.5 g. of polyvinyl acetate emulsion and 4 g. of polyvinyl acetal per 10 g. of microcrystalline zinc oxide.

Each of the electrophotographic plates 1–5 inclusive, is exposed to light and developed. The density of each developed image is then measured by the densitometer manufactured by Japan Denshoku Industry Company, Ltd. The density of the developed image for each sample is given by the corresponding curve in FIG. 2. A dense image is produced on the electrophotographic plate 1 when it is developed within 3 minutes after exposure. The density of the developed image, however, becomes very low for sample 1 when the development takes place in the time interval between 3 minutes and 5 minutes after exposure, and a visible image is not obtained when developed 6 minutes after exposure. Namely, curve 1 clearly shows that the photographic plate 1 recovers from the memory effect in 6 minutes after exposure.

The electrophotographic plate 2 produces a dense image when developed just after exposure. The decay rate becomes very fast five minutes after exposure and plate 2 recovers perfectly from the memory effect in 8 minutes after exposure.

The electrophotographic plate 3 produces a dense image thereon when it is developed just after exposure. The decay rate becomes fast after 3 minutes after exposure and the plate recovers perfectly from the memory effect in 8 minutes after exposure.

The electrophotographic plate 4 produces a visible image thereon with a little lower density than the image produced on electrophotographic plates 1, 2 and 3 when the electrophotographic plate 4 is developed just after exposure. Electrophotographic plate 4 recovers completely from the memory effect in 9 minutes after exposure.

The electrophotographic plate 5 produces a visible image thereon of substantially the same density as the visible image produced by electrophotographic plate 4 and electrophotographic plate 5 recovers perfectly from the memory effect in 9 minutes after exposure.

It will be apparent that other photoconductive materials can be used in the practice of the invention in place of the microcrystalline zinc oxide.

To illustrate the invention more clearly the following examples are given by way of illustration of the inventive concept.

EXAMPLE I 10 g. of tartaric acid is dissolved in 1000 cc. of warm water, and 30 cc. of such tartaric acid solution is added to 10 g. of polyvinyl acetal (purity 100%) and 30 g. of polyvinyl acetate emulsion (purity 100%) and 100 g. microcrystalline zinc oxide of a grain size between $0.1\mu$ and $0.3\mu$, and 250 cc. of water. The composition is then ground for 1 hour in a ball mill, and thereafter coated to a thickness of $10\mu$ on art paper and dried. It is observed that the electrophotographic plate thus produced recovers from the memory effect in 4 minutes after exposure.

EXAMPLE II 6 g. of succinic acid is dissolved in 1000 cc. of warm water, and 30 cc. of such succinic acid solution is added to 15 g. of polyvinyl acetal (purity 100%) and 20 g. of polyvinyl acetate emulsion (purity 100%) and 100 g. of microcrystalline zinc oxide and 250 cc. of water. The composition is then ground for 2 hours in a ball mill, and thereafter coated on art-paper to a thickness of $10\mu$ and dried. It is observed that the electrophotographic plate thus produced recovers from the memory effect in 6 minutes after exposure.

As described above, the electrophotographic plate in accordance with the invention recovers quickly from the memory effect caused by exposing to light. Consequently, the electrophotographic plate can be handled in the light without damage to the electrophotographic plate so that a clear and distinct developed image can be made on the electrophotographic plate even after exposure of the electrophotographic plate to light for an extended time. The electrophotographic plate can be placed in the dark for a sufficient time of from 4 to 9 minutes and then the so-treated electrophotographic plate can be used to make a copy by exposure to an image of light and then developing the image in the usual manner.

Accordingly, the method of the invention makes it possible to produce quickly a good electrostatic print and also makes it possible to use the chargeless electrostatic printing process in actual reproduction work for office use.

Heretofore, it was believed that water-soluble resins were not suitable for producing electrophotographic plates for use in the chargeless electrostatic printing process. However, as explained above the present invention makes it possible to obtain a good copy of satisfactory density and contrast by developing the light produced latent image within 3 minutes after exposure and the results are obtained having substantially the same density as latent images developed just after exposure and this can be controlled by the two or more types of water soluble resins used as a binder.

It will also be apparent that the time required for the recovery of the memory effect can be controlled in accordance with the properties of the photoconductive material by changing the ratio of the mixture of resins with relation to the photoconductive material.

It will be apparent that various changes may be made in the practice of the invention within the spirit of the invention as defined by the valid scope of the claims.

We claim:
1. An electrophotographic plate for chargeless electrostatic printing, comprising a base and a photoconductive layer coated thereon, wherein said photoconductive layer consists essentially of a photoconductive zinc oxide dispersed in a water soluble binding material, said binding material being essentially a blend of polyvinyl acetate and polyvinyl acetal in the proportions by weight of 4:0.5 to 0.5:4, respectively, whereby the recovery from exposure to ambient light is rapid.

2. The electrophotographic plate of claim 1, wherein the photoconductive material is present in the amount of approximately 10 grams to 4.5 grams of the binding material.

3. A method of chargeless electrostatic printing, which comprises forming a light image on an electrophotographic plate without charging it beforehand, thereby producing an electrostatic image on the said plate and developing the said plate with a toner having electrical charges, characterized in that said electrophotographic plate comprises a base and a photoconductive layer coated thereon, said photoconductive layer consisting essentially of a photoconductive zinc oxide dispersed in a water soluble binding material, said binding material being a blend of polyvinyl acetate and polyvinyl acetal whereby the recovery from exposure to ambient light is rapid.

4. The invention according to claim 3 in which the polyvinyl accetal polyvinyl acetate are in the proportions of 0.5:4 to 4:0.5 respectively.

References Cited

UNITED STATES PATENTS

| | | | |
|---|---|---|---|
| 2,990,280 | 6/1961 | Giaimo | 96—1 |
| 3,159,483 | 12/1964 | Behmenberg et al. | 96—1 |
| 3,197,307 | 7/1965 | Blake et al. | 96—1 |
| 3,245,786 | 4/1966 | Cassiers et al. | 96—1 |
| 3,287,127 | 11/1966 | Hoege | 96—1.5 |
| 3,406,063 | 10/1968 | Matkan et al. | 96—1.5 |

GEORGE F. LESMES, Primary Examiner

J. C. COOPER, Assistant Examiner

U.S. Cl. X.R.

96—1; 260—874